(12) United States Patent
Sweere et al.

(10) Patent No.: US 9,057,476 B2
(45) Date of Patent: Jun. 16, 2015

(54) BINDER SUPPORT APPARATUS

(71) Applicants: Joseph J. Sweere, Owatonna, MN (US); Craig J. Sweere, San Diego, CA (US)

(72) Inventors: Joseph J. Sweere, Owatonna, MN (US); Craig J. Sweere, San Diego, CA (US)

( * ) Notice: Subject to any disclaimer, the term of this patent is extended or adjusted under 35 U.S.C. 154(b) by 132 days.

(21) Appl. No.: 13/870,639

(22) Filed: Apr. 25, 2013

(65) Prior Publication Data

US 2013/0284873 A1 Oct. 31, 2013

Related U.S. Application Data

(60) Provisional application No. 61/638,681, filed on Apr. 26, 2012.

(51) Int. Cl.
*B42F 13/00* (2006.01)
*F16M 13/00* (2006.01)

(52) U.S. Cl.
CPC ............. *F16M 13/00* (2013.01); *B42F 13/00* (2013.01)

(58) Field of Classification Search
USPC ............... 248/351, 354.5, 441.1, 463, 465; 281/20, 45
See application file for complete search history.

(56) References Cited

U.S. PATENT DOCUMENTS

| | | |
|---|---|---|
| 501,751 A | 7/1893 | Waring |
| 717,842 A | 1/1903 | Grimes |
| 763,554 A | 6/1904 | Greene |
| 1,329,910 A | 2/1920 | Lambert |
| 1,337,612 A | 4/1920 | Miller |
| 1,711,894 A | 5/1929 | Lawrence |
| 1,891,814 A | 6/1930 | Haskin |
| 1,929,482 A * | 10/1933 | Copeland ..................... 248/459 |
| D214,236 S | 5/1969 | Orth et al. |
| 4,011,940 A | 3/1977 | Neal et al. |
| 4,524,991 A | 6/1985 | Thomas |
| 4,531,764 A | 7/1985 | Chang |
| 4,569,613 A | 2/1986 | Thomas |
| 4,588,321 A | 5/1986 | Egly |
| 4,687,226 A | 8/1987 | Rose, Jr. |
| D293,335 S | 12/1987 | Egly |
| 4,744,689 A | 5/1988 | Sternberg |
| 4,793,633 A | 12/1988 | Rose, Jr. |
| 4,997,207 A | 3/1991 | Feldman |
| 5,002,416 A | 3/1991 | Serzen |
| 5,108,130 A | 4/1992 | Hansen |
| 5,267,804 A | 12/1993 | Baumgarten |
| 5,380,111 A | 1/1995 | Westrom |
| 5,398,971 A | 3/1995 | Ayele |

(Continued)

OTHER PUBLICATIONS

"FreeStand™ EasyOpen® Binder with Locking Slant-D® Shape Ring, 2" White datasheet [online]. TOPS Products, Warrenville, IL, 2013 [retrieved on Apr. 26, 2013]. Retrieved from the Internet:<URL:www.tops-products.com/catalog/product/view/id/1543/s/easyopenr-freestandtm-binder-with-locking-slant-dr-shape-ring-2-wh>; 1 page.

(Continued)

*Primary Examiner* — Steven Marsh
(74) *Attorney, Agent, or Firm* — Mueting, Raasch & Gebhardt, PA

(57) ABSTRACT

Binder support apparatus may be configured to support binder covers apart from one another. The binder support apparatus may include two or more portions configured to be coupled to opposing binder covers. At least one portion of the binder support apparatus may be configured into locked and unlocked positions.

21 Claims, 19 Drawing Sheets

(56) References Cited

U.S. PATENT DOCUMENTS

| | | |
|---|---|---|
| D366,496 S | 1/1996 | Yiu |
| 5,590,909 A | 1/1997 | Urban et al. |
| 5,634,666 A | 6/1997 | Lee |
| 5,897,141 A | 4/1999 | Dugmore et al. |
| 5,947,521 A | 9/1999 | Stucki |
| 6,007,103 A | 12/1999 | Tomasello |
| 6,161,868 A | 12/2000 | Verhoff et al. |
| 6,467,808 B1 | 10/2002 | Kirby |
| 6,626,602 B1 * | 9/2003 | Yuen .................... 402/73 |
| 6,944,918 B1 | 9/2005 | Woolson et al. |
| 7,373,748 B2 * | 5/2008 | Pitcher et al. ............. 40/658 |
| 7,399,136 B2 | 7/2008 | Petrie et al. |
| 7,736,081 B2 | 6/2010 | Taylor et al. |
| 8,540,451 B2 * | 9/2013 | Mindler ..................... 402/21 |
| 2014/0001741 A1 * | 1/2014 | Wang ........................ 281/45 |

OTHER PUBLICATIONS

Photograph of FreeStand™ EasyOpen® Binder with Locking Slant-D® Shape Ring, 2 White, datasheet [online]. TOPS Products, Warrenville, IL, 2013 [retrieved on Apr. 26, 2013]. Retrieved from the Internet:URL:www.tops-products.com/media/catalog/product/cache/4/econtent_image_2/9df78eab33525d08d6e; 1 page.

* cited by examiner

Fig. 8C
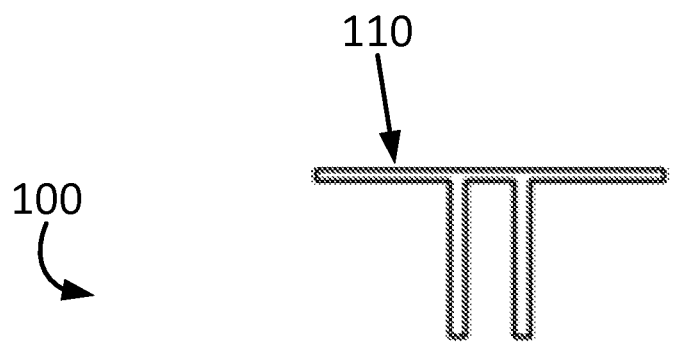
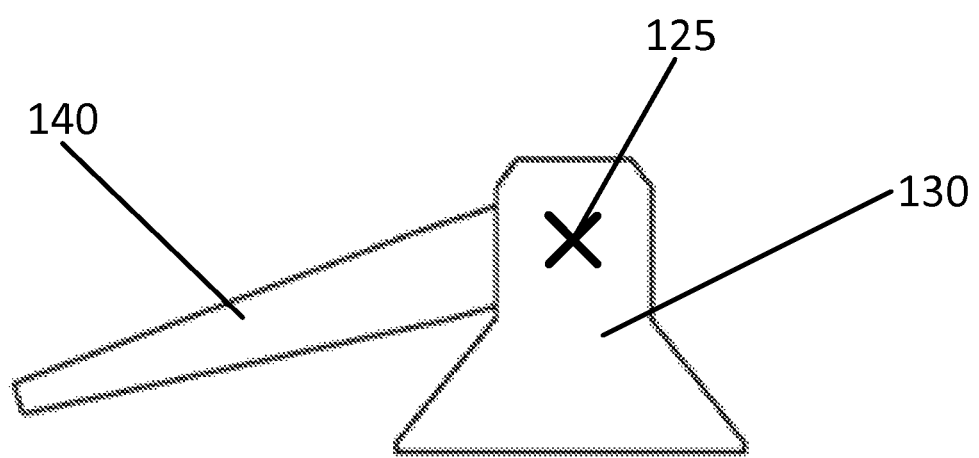

BINDER SUPPORT APPARATUS

CROSS-REFERENCE TO RELATED APPLICATIONS

This application claims the benefit of U.S. Provisional Application Ser. No. 61/638,681 filed 26 Apr. 2012, entitled "Binder Support Apparatus," which is incorporated herein by reference in its entirety.

BACKGROUND

The present disclosure relates generally to binder support apparatus to support the front cover portion of a binder apart from the rear cover portion of the binder.

Binders, such as 3-ring binders, may contain one or more pages of material (e.g., material to be read or referenced by a user). Such binders are often stored on bookcases, shelves, file cabinets, or the like. The amount of material contained with a binder may often dictate the shape of the binder. For example, if the binder contains more or less than a certain amount of material, then the binder may not define rectangular, box-like shape. For instance, the binder may be a triangular or isosceles-trapezoidal box-like shape. Such shapes, however, may be inefficient and/or ineffective for the storage of binders on bookcases, shelves, file cabinets, or the like.

SUMMARY

Generally, the disclosure herein describes binder support apparatus configured to support a front cover portion of a binder apart from a rear cover portion of the binder to, e.g., provide efficient and effective storage of the binder. The front and rear cover portions of the binder each may extend along, or in, a plane from a left end to a right end along a first axis and may be coupled to each other proximate the left ends thereof. Further, the front and rear cover portions of the binder each may extend from a bottom side to a top side along a second axis orthogonal to the first axis.

One exemplary binder support apparatus may include a first portion and a second portion (e.g., one or both of the first portion and the second portion may include polymer material). The first portion may extend from a first end region to a second end region along a first portion axis and may be configured to be coupled to the front cover portion of the binder such that the first portion axis is parallel to the second axis of the binder (e.g., adhesive or adhesive tape may be used to couple the first portion to the front cover portion of the binder). Further, the first portion may define a mating region (e.g., configured to mate with at least a part, or a portion, of the second portion).

The second portion may extend from a first end region to a second end region along a second portion axis. The second portion may include a stationary portion and a movable portion. The stationary portion may extend from the first end region to the second end region and may be configured to be coupled to the rear cover portion of the binder such that the second portion axis is parallel the second axis of the binder (e.g., adhesive may be used to couple the stationary portion to the rear cover portion of the binder).

The movable portion may be movably coupled to the stationary portion and may extend from the first end region to the second end region. Further, the movable portion may be configured to mate with the mating region of the first portion to support the right ends of the front and rear cover portions of the binder apart from one another. The movable portion may be movable between a locked position and an unlocked position. For example, the movable portion may lie in a plane perpendicular to the rear cover portion when in the locked position and may be pivotable about the second portion axis when in the unlocked position. In at least one embodiment, the mating region may define a receiving slot configured for receiving at least a portion of the movable portion of the second portion when the movable portion is mated with the mating region of the first portion to support the right ends of the front and rear cover portions apart from one another.

In one or more embodiments, one or both of the first and second portions of the binder support apparatus may be configured to extend along at least 10%, 20%, 25%, 30%, 40%, 50%, 66%, 75%, 80%, 90%, etc. of the distance between the bottom side and the top side of the binder. In one or more embodiments, the first portion may define a length extending along the first portion axis from the first end region to the second end region and the second portion may define a length extending along the second portion axis from the first end region to the second end region. The lengths of the first and second portions may be greater than about 2 inches, about 3 inches, about 4 inches, about 5 inches, about 7 inches, about 10 inches, about 11 inches, etc. and/or less than about 4 inches, about 5 inches, about 7 inches, about 10 inches, about 11 inches, etc.

In one or more embodiments, to facilitate the locked and unlocked positions of the movable portion, the stationary portion of the second portion may define a first slot extending orthogonal to the second portion axis and proximate the first end region, a second slot extending orthogonal to the second portion axis and proximate the second end region, and a locking slot extending parallel to the second portion axis between the first and second slots. Further, in at least one embodiment, the movable portion may include a first pin proximate the first end region configured to be located in the first slot of the stationary portion to couple (e.g., movably couple) the movable portion to the stationary portion, a second pin proximate the second end region configured to be located in the second slot of the stationary portion to couple (e.g., movably couple) the movable portion to the stationary portion, and a rear region configured to be located in the locking slot of the stationary portion when in the locked position. In at least one embodiment, one or both of the first and second slots of the stationary portion may define an unlock region and a lock region. The first and second pins of the movable portion may be located in the unlock region when the movable portion is in the unlocked position and may be located in the lock region when the movable portion is in the locked position.

In one or more embodiments, the movable portion of the second portion may define a taper from a rear region to a distal region and at least part of the distal region may be configured to mate with the mating region of the first portion to support the right ends of the front and rear cover portions apart from one another.

The above summary is not intended to describe each embodiment or every implementation of the binder support apparatus. Advantages, together with a more complete understanding, will become apparent and appreciated by referring to the following detailed description and claims taken in conjunction with the accompanying drawings.

BRIEF DESCRIPTION OF THE VIEWS OF THE DRAWINGS

FIGS. 8A-8C are end views of the binder support apparatus of FIG. 5.

DETAILED DESCRIPTION OF EXEMPLARY EMBODIMENTS

Figure 1:
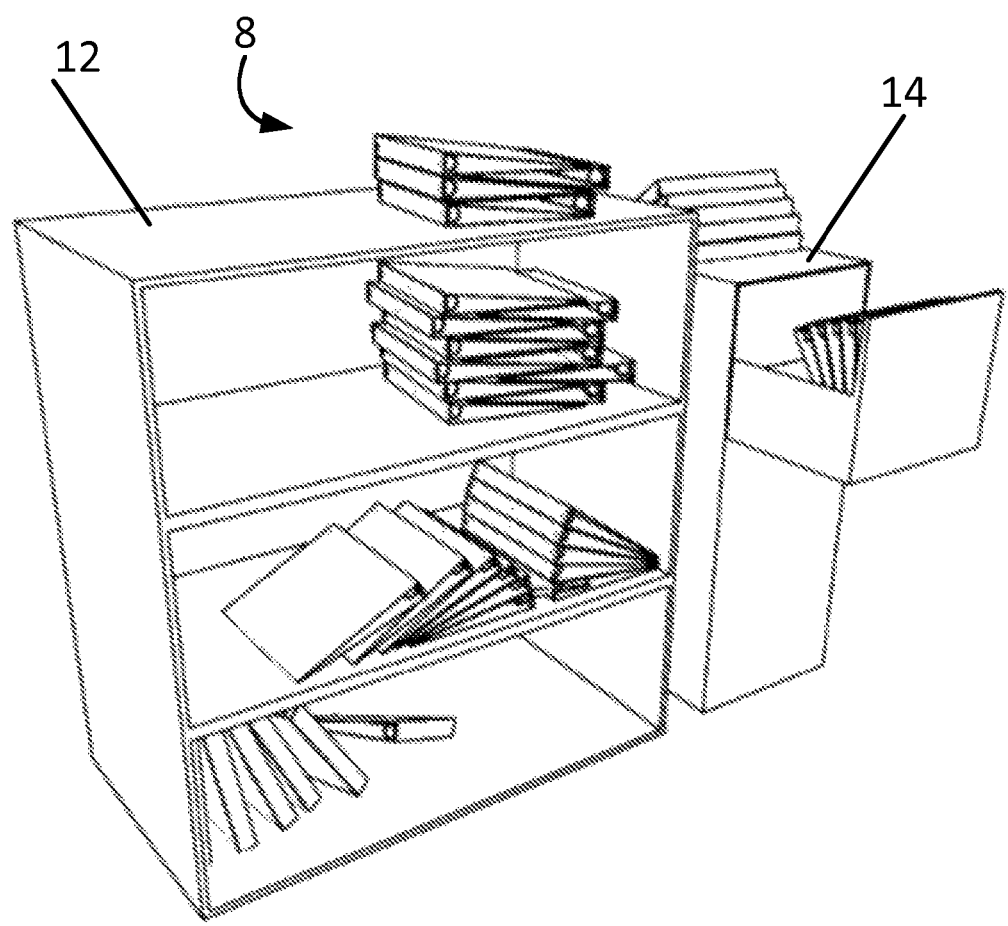
FIG. 1 is a perspective view of a shelf and file cabinet with a plurality of binders located therein and thereon.

In the following detailed description of illustrative embodiments, reference is made to the accompanying figures of the drawing which form a part hereof, and in which are shown, by way of illustration, specific embodiments which may be practiced. It is to be understood that other embodiments may be utilized and structural changes may be made without departing from (e.g., still falling within) the scope of the disclosure presented hereby.

Exemplary apparatus shall be described with reference to FIGS. 1-14. It will be apparent to one skilled in the art that elements from one embodiment may be used in combination with elements of the other embodiments, and that the possible embodiments of such apparatus using combinations of features set forth herein is not limited to the specific embodiments shown in the Figures and/or described herein. Further, it will be recognized that the embodiments described herein may include many elements that are not necessarily shown to scale. Still further, it will be recognized that timing of the size and shape of various elements herein may be modified but still fall within the scope of the present disclosure, although certain timings, one or more shapes and/or sizes, or types of elements, may be advantageous over others.

As shown in FIG. 1, a plurality of binders 8 are shown located on and within a shelf 12 and a file cabinet 14. As can be seen, the triangular box-like shape of the binders 8 does not lend themselves to be efficiently and effectively stored within and on the shelf 12 and the file cabinet 14. Instead, for example, the triangular box-like shape of the binders 8 creates unstable stacks of binders 8, which may be prone to sliding around and/or falling over.

Binder support apparatus is described herein with reference to FIGS. 2-14 for supporting a front cover portion of a binder apart from a rear cover portion of the binder to, e.g., provide more effective and more efficient storage within and on shelves, file cabinets, and the like (e.g., by forming a rectangular box-like shape that is more amenable to effective and/or efficient storage, etc.).

Figure 2:
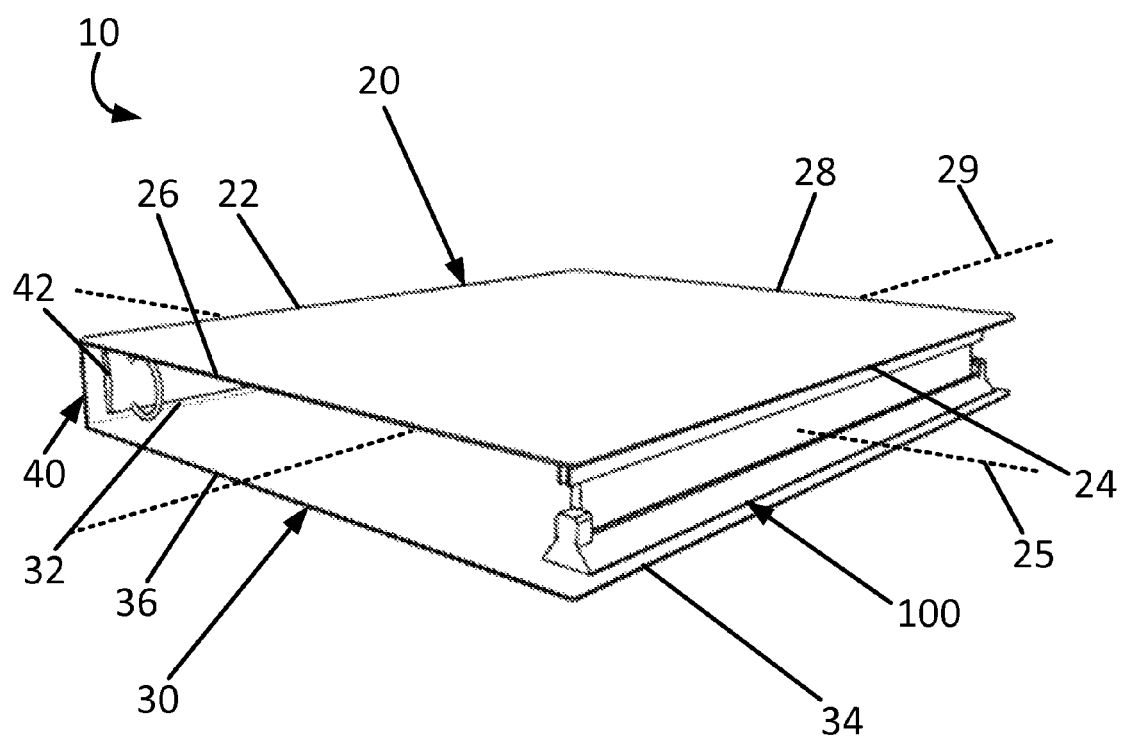
FIG. 2 is a perspective view of a binder and an exemplary binder support apparatus.

Generally, as shown in FIG. 2, a binder 10 may include a front cover portion 20 and a rear cover portion 30. Each of the front and rear cover portions 20, 30 may extend in a plane from a left end 22, 32 (or proximal end), to a right end 24, 34 (or distal end), along (e.g., parallel to) a first axis 25. Further, the front and rear cover portions 20, 30 may be coupled to each other proximate the left ends 22, 32, thereof. For example, as shown in FIG. 2, the binder 10 includes a spine cover portion 40 that is coupled to each of the left ends 22, 32 of the front and rear cover portions 20, 30, respectively. In other words, the spine cover portion 40 may be configured to couple the front cover portion 20 to the rear cover portion 30. As shown in this example, ringed apparatus 42 is coupled to the spine cover portion 40 and used to capture, or couple, one or more pieces of paper or other material within the binder 10 between the front and the rear cover portions 20, 30. In other exemplary binders, ringed apparatus 42 may be coupled to one of the front and rear cover portions 20, 30. Although ringed apparatus 42 is described herein, other exemplary binders may utilize other material containing, or holding, apparatus, or no material containing apparatus.

Each of the front and rear cover portions 20, 30 also extends from a bottom side 26, 36 to a top side 28, 38 along a second axis 29 orthogonal to the first axis 25. Further, as shown, each of the front and rear cover portions 20, 30 defines a rectangular shape. In other embodiments, each of the front and rear cover portions may define a shape other than a rectangle depending, e.g., on the type and/or size of the material contained within the binder.

Figure 3:
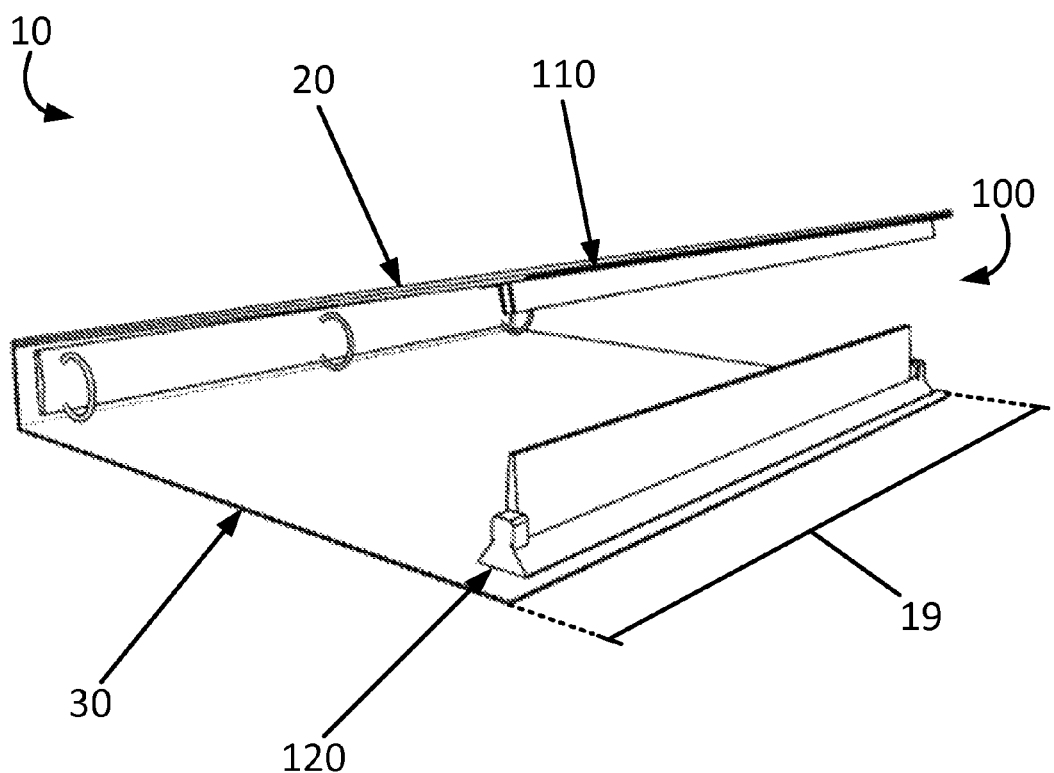
FIGS. 3-4 are perspective views of the binder and binder support apparatus of FIG. 2 with the binder being partially open.
Figure 4:
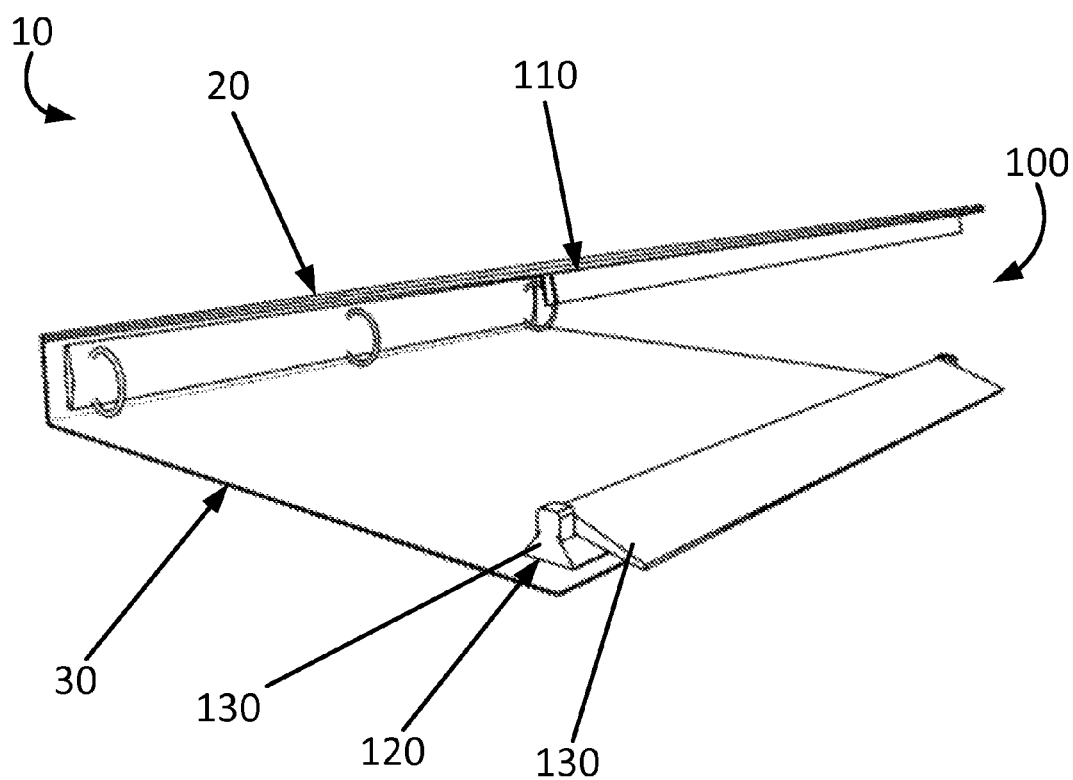

An exemplary binder support apparatus 100 coupled to the exemplary binder 10 is shown in FIGS. 2-4. The binder support apparatus 100 may be configured for supporting the front cover portion 20 of the binder 10 apart from the rear cover portion 30 of the binder 10 as shown in FIG. 2. More specifically, the binder support apparatus 100 may be configured to support, or hold, each of the right ends 24, 34 of the front and rear cover portions 20, 30 apart from one another such that, e.g., the binder 10 may take the shape, or define, a substantially box-like shape to facilitate, or enable, stable stacking, efficient storage, effective storage, ease of storage, etc.

The front cover portion 20 of the binder 10 may be pivoted, or opened, about an axis defined by the left side 22, and likewise, the rear cover portion 30 of the binder 10 may be pivoted, or opened, about an axis defined by the left side 32 to open the binder 10 to, e.g., expose the material located within, or contained by, the binder 10. For example, the binder 10 may be described as being in an open position when the right sides 22, 32 of the front and rear cover portions 20, 30 are located away from each other such that any material contained, or located, in the binder 10 is exposed, and the binder 10 may be described as being in a closed position when the right sides 22, 32 of the front and rear cover portions 20, 30 are located proximate one another and/or supported by the binder support apparatus 100 (e.g., such that any material located or contained in the binder 10 is not fully, or completely, exposed). As shown in FIGS. 3-4, the binder 10 is in a partially-open position (e.g., an intermediate position between a completely-open position and the closed position), which exposes the binder support apparatus 100 while the front cover portion 20 and the rear cover portion 30 are not supported by the binder support apparatus 100.

As described herein, the exemplary binder support apparatus 100 may be configured to support the front and rear cover portions 20, 30 of a binder 10 away, or apart, from each other to, e.g. provide more effective stacking and/or storage of the binder 10. To provide such support to the binder 10, the exemplary binder support apparatus 100 may include one or more portions attachable, or couplable, (e.g., fixedly attached or coupled, etc.) to one or more portions of the binder 10. Although exemplary binder support apparatus may include two or more portions, the exemplary binder support apparatus 100 depicted in FIGS. 2-14 may be generally described as including two portions, each of the two portions including one or more portions, regions, etc.

Figure 5:
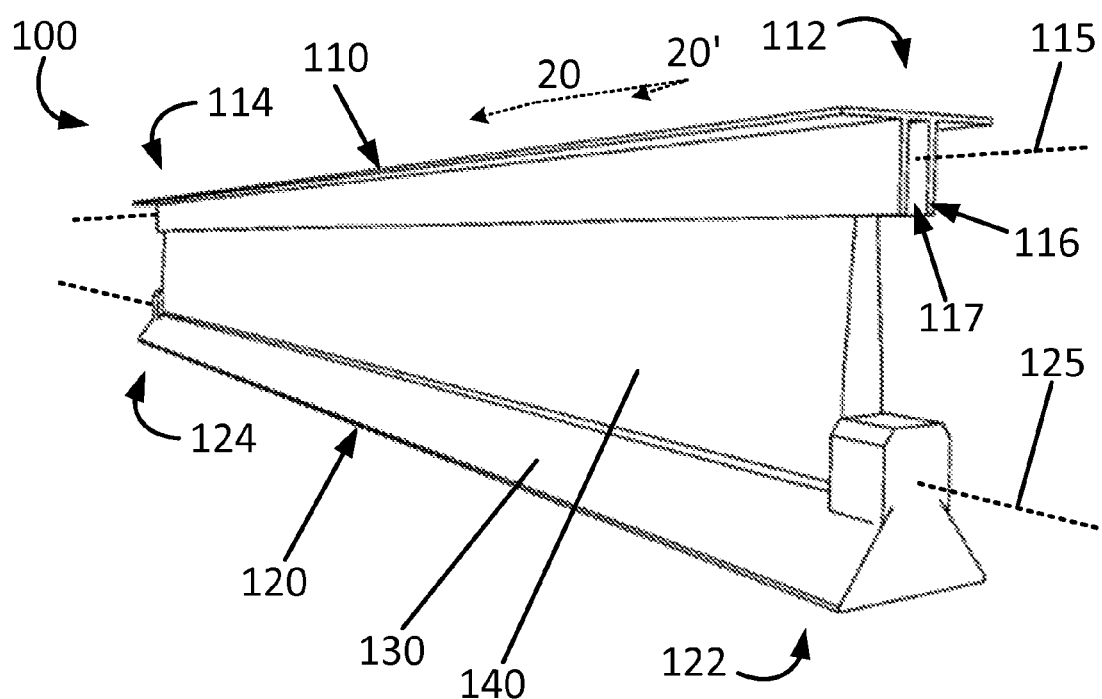
FIG. 5 is a perspective view of the binder support apparatus of FIGS. 2-4.

The exemplary binder support apparatus 100 shown in FIGS. 2-10 may be described as including a first portion 110 and a second portion 120 as shown in FIGS. 3-4. The first portion 110 may extend from a first end region 112 to a second end region 114 along a first portion axis 115 as shown in FIG. 5. The first portion 110 may define a generally longitudinal shape where the length (defined extending along the first portion axis 115) exceeds the width (defined as extending perpendicular to the first portion axis 115).

The first portion 110 may be configured to be coupled to the front cover portion 20 (or rear cover portion 30) of the binder 10 such that the first portion axis 115 is parallel to the second axis 29 of the binder 10 (e.g., when the binder 10 is configured into a substantially box-like shape in a closed position). For example, the first portion 110 may define a substantially flat surface 111 (as identified in FIGS. 6-7) that may be coupled (e.g., attached, adhered, removably coupled, permanently coupled, etc.) to the front cover portion 20 of the binder 10. In at least one embodiment, adhesive tape (e.g., double-sided adhesive tape) may be used to couple, or adhere, the first portion 110 to the front cover portion 20 of the binder 10. More specifically, adhesive tape may be applied to the flat surface 111 of the first portion 110 and the flat surface 111 may be located (e.g., pressed, etc.) adjacent, or against, the front cover portion 20 with the adhesive tape located therebetween. Further, for example, the first portion 110 may be attached, or coupled, to the front cover portion 20 of the binder 10 using screws, bolts, Velcro, glue, rivets, rubber cement, magnetic apparatus, snap locks, and/or any other attachment devices or material.

Figure 7:
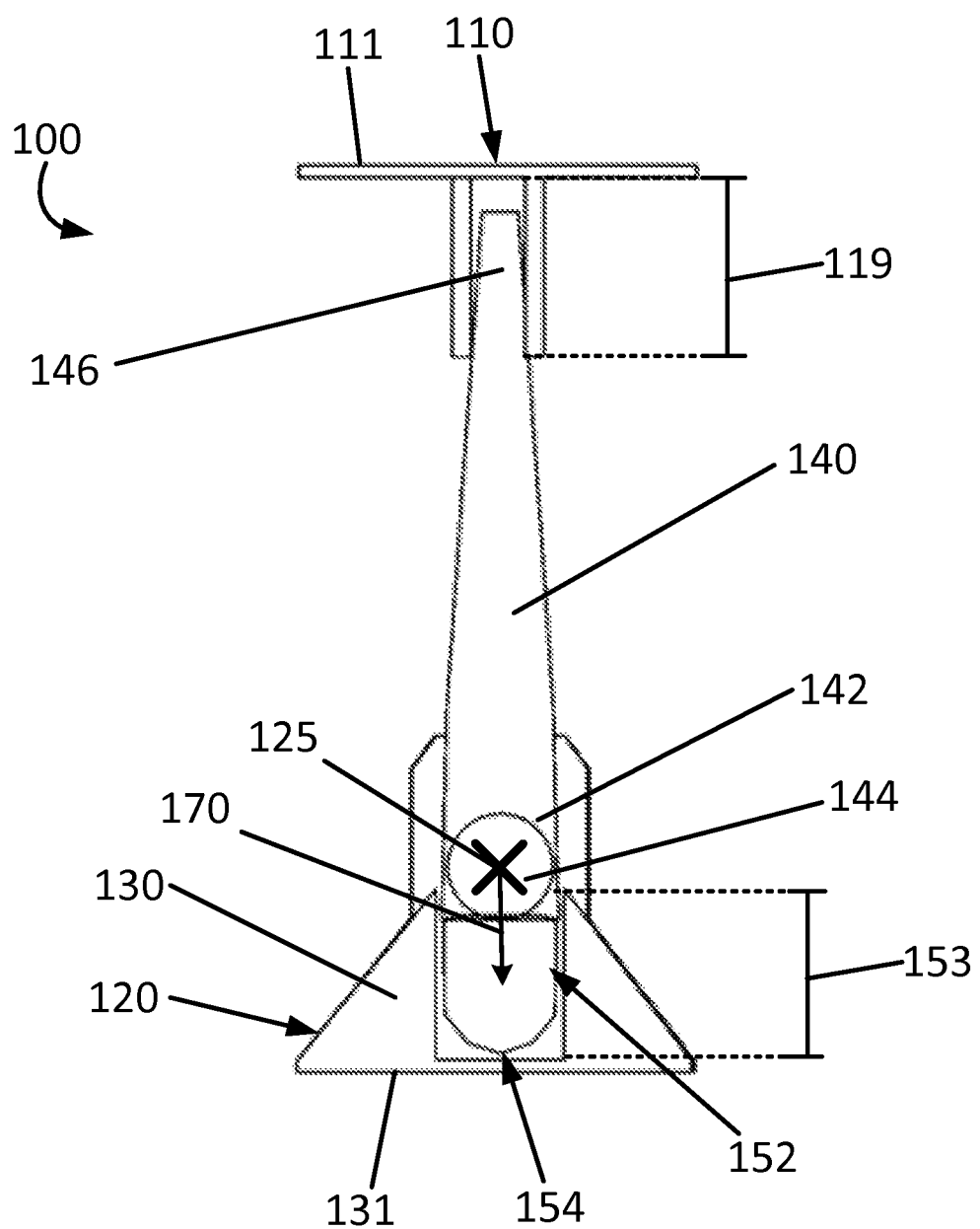
FIG. 7 is cross-sectional view of the binder support apparatus of FIG. 5 taken across line 20-20'.

The first portion 110 of the binder support apparatus 100 may further define a mating region 116 configured to mate (e.g., join with, couple to, attach to, etc.) with at least a part or region of the second portion 120 of the binder support apparatus 100 to support the front and rear cover portions 20, 30 apart from one another as described herein. In at least the embodiment depicted, the mating region 116 defines a channel 117 extending from the first end region 112 to the second end region 114 for receiving at least a part or region of the second portion 120 (as shown in FIG. 5). For example, the channel 117 may provide an interference fit with at least a part or portion of the second portion 120 to support the right ends 24, 34 of the front and rear cover portions 20, 30, respectively, of the binder 10 apart from one another. In other words, the channel 117 may provide a snug, or tight, fit for at least a part or portion of the second portion 120. Further, the channel 117 may define a depth 119 as shown in FIG. 7. The depth 119 may be about ⅛ of an inch to about 1½ inches such as, e.g., about ⅛ of an inch, about ¼ of an inch, about ⅜ of an inch, about ½ of an inch, about ⅝ of an inch, about ¾ of an inch, about ⅞ of an inch, about 1 inch, about 1⅛ inches, 1¼ inches, 1⅜ inches, 1½ inches, etc.

The second portion 120 of the binder support apparatus 100 may extend from a first end region 122 to a second end region 124 along a second portion axis 125. Similar to the first portion 110, the second portion 120 may define a generally longitudinal shape where the length (defined extending along the second portion axis 125) exceeds the width (defined as extending perpendicular to the second portion axis 125). One or both of the first portion 110 and the second portion 120 of the binder support apparatus 100 may extend along an entire length of the binder 10 or a portion of the length of the binder 10. For example, the length of one or both of the first portion 110 and the second portion 120 may be defined in terms of the length 19 of the binder labeled in FIG. 3. The length 19 may be defined as the distance between the top ends 28, 38 and the bottom ends 26, 36 of the front and rear cover portions 20, 30, respectively, of the binder 10 taken parallel to the axis 29 (e.g., when the binder 10 is configured into a substantially box-like shape in a closed position). The length 113 of the first portion 110 of the binder support apparatus 100 may be defined as extending from the first end region 112 to the second end region 114, and the length 123 of the second portion 120 of the binder support apparatus 100 may be defined as extending from the first end region 122 to the second send region 124. The length 113, 123 of one or both of the first portion 110 and the second portion 120 may equal to or less than the length 19. For example, the length 113, 123 of one or both of the first and second portions 110, 120 may be greater than or equal to about 20% of the length 19, about 25% of the length 19, about 40% of the length 19, about 50% of the length 19, about 65% of the length 19, about 75% of the length 19, about 90% of the length 19, about 100% of the length 19, etc. Further, for example, the length 113, 123 of one or both of the first and second portions 110, 120 may be less than or equal to about 50% of the length 19, about 65% of the length 19, about 75% of the length 19, about 90% of the length 19, about 100% of the length 19, etc.

In at least one embodiment, the length 19 may be about 4 inches, about 5 inches, about 6 inches, about 8.5 inches, about 10 inches, about 10.5 inches, about 11.5 inches, about 12 inches, about 14 inches, about 16 inches, etc. Further, the length 113, 123 of one or both of the first and second portions 110, 120 may be less than or equal to about 1.5 inches, about 2 inches, about 3 inches, about 4 inches, about 5 inches, about 6 inches, about 8.5 inches, about 10 inches, about 11.5 inches, about 12 inches, about 14 inches, about 16 inches, etc. Further, the length 113, 123 of one or both of the first and second portions 110, 120 may be greater than or equal to about 0.5 inches, about 1 inch, about 1.5 inches, about 2 inches, about 2.5 inches, about 3 inches, about 4.5 inches, about 6 inches, about 8 inches, about 10 inches, etc. In at least one embodiment, the length 113, 123 of each of the first and second portions 110, 120 may be about 11.25 inches. In other word, the first and second portions 110, 120 may extend nearly across 11.5 inch binder, i.e., a binder 10 having a length 19 of 11.5 inches.

The second portion 120 of the binder support apparatus 100 may include one or more portions, regions, members, parts, etc. For example, the second portion 120 of the exemplary binder support apparatus 100 may be described as including a stationary portion (or member) 130 and a movable portion (or member) 140. One or both of the stationary portion 130 and the movable portion 140 may extend from the first end region 122 to the second end region 124. As shown in FIG. 5, although the movable portion 140 does not extend to the very end of the stationary portion 130, each of the stationary portion 130 and the movable portion 140 may be described as extending from the first end region 122 to the second end region 124 of the second portion 120. In some embodiments, only one of the stationary portion 130 and the movable portion 140 may extend from the first end region 122 to the second end region 124. For example, in one embodiment, the movable portion 140 may not extend completely between the first end region 122 and the second end region 124 (e.g., less than halfway, about halfway, less than about ¾ etc.).

The stationary portion 130 may be configured to be coupled to the rear cover portion 30 (or the front cover portion 20—whichever cover portion 20, 30 that the first portion 110 is not coupled to) of the binder 10 such that the second portion axis 125 is parallel to the second axis 29 of the binder 10. For example, the stationary portion 130 may define a substantially flat surface 131 that may be coupled (e.g., attached, adhered, removably coupled, permanently coupled, etc.) to the rear cover portion 30 of the binder 10. In at least one embodiment, adhesive tape (e.g., double-sided adhesive tape) may be used to adhere the stationary portion 130 to the rear cover portion 30 of the binder 10. More specifically, adhesive tape may be applied to the flat surface 131 of the stationary portion 130 and the flat surface 131 may be located (e.g., pressed, etc.) adjacent, or against, the rear cover portion 30 with the adhesive tape located therebetween. Further, for example, the stationary portion 130 may be attached, or coupled, to the rear cover portion 30 of the binder 10 using screws, bolts, Velcro, glue, rivets, rubber cement, magnetic apparatus, snap locks, and/or any other attachment devices or material.

The movable portion 140 may be configured to move with respect to the stationary portion 130 while remaining coupled to the stationary portion 130. To facilitate such movement between the movable portion 140 and the stationary portion 130, the movable portion 140 may be movably coupled to the stationary portion 130 as will be described further herein. The movable portion 140 of the second portion 120 may be further configured to mate with, or couple to, the mating region 116 of the first portion 110 to support the right ends 24, 34 of the front and rear cover portions 20, 30, respectively, of the binder 10 apart from one another. For example, as shown in FIG. 2, at least a portion of the movable portion 140 has been mated with the mating region 116 of the first portion 110 to support the right ends 24, 34 of the front and rear cover portions 20, 30, respectively, of the binder 10 apart from one another. In this position, the binder 10 may form, or define, a rectangular box-like shape that may provide more efficient and more effective storage (e.g., so as to provide stable structures when stacked, etc.), e.g., when the binder is in a closed position. As shown in FIG. 3, the movable portion 140 may not be mated with the mating region 116 of the first portion 110 when not used to support the binder 10, e.g., when the binder is in an open or partially-open position.

As described herein, the movable portion 140 may be movable with respect (e.g., through a movable coupling) to the stationary portion 130. In other words, the movable portion 140 may remain coupled to the stationary portion 130 and may still be movable between one or more of a plurality of positions with respect to the stationary portion 130, which may remain stationary and attached to a binder cover. Generally, the movable portion 140 may have movement (e.g., linear movement) into, and out of, a locked position and an unlocked position, and may have pivotal movement about a pivot axis into multiple positions about the pivot axis when in the unlocked position.

Figure 8A:
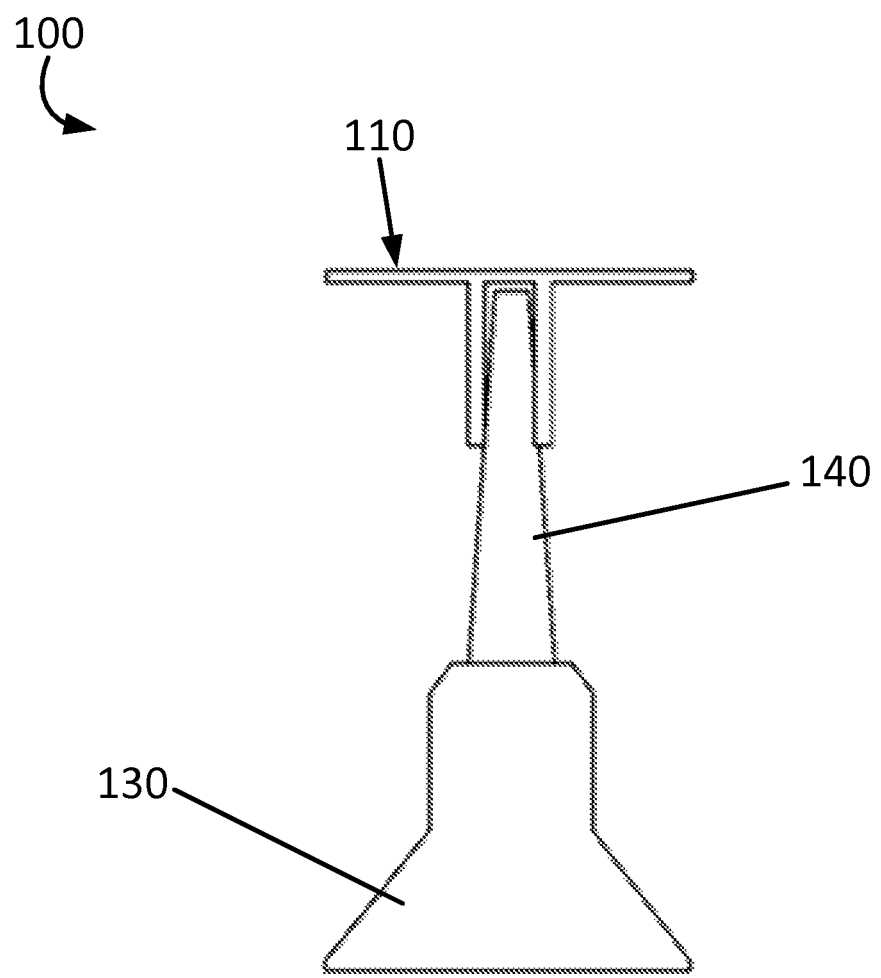
Figure 8B:
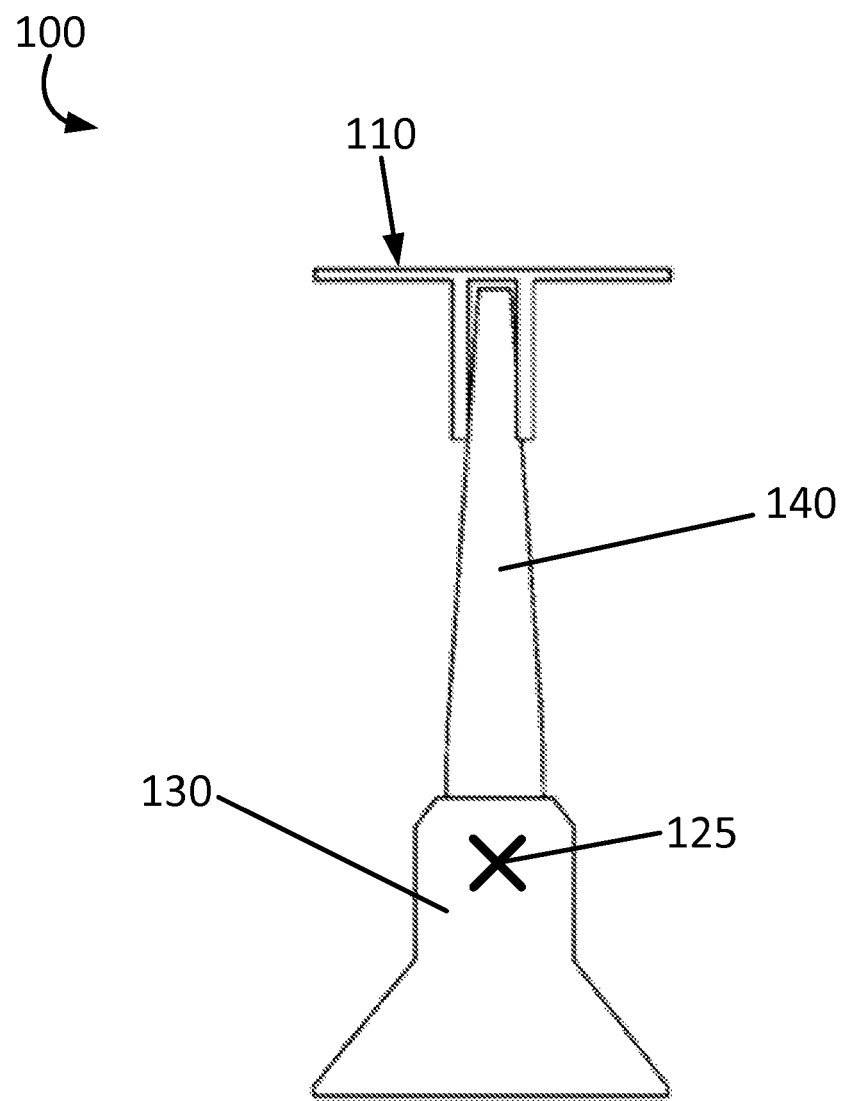

The movable portion 140 is shown in FIGS. 7 and 8A-8C moving between at least a locked position, an unlocked position, and a pivoted position. In at least the embodiment depicted, when in the locked position, the movable portion 140 may lie in a plane perpendicular to the rear cover portion 30 as shown in FIG. 8A, and when in the unlocked position, the movable portion 140 may be pivotable about the second portion axis 125 as shown in FIGS. 8B-8C. When in the unlocked position, the movable portion 140 may be able to move freely so as to be, e.g., located in a "folded down" position (e.g., to be out of the way while a user may be reading, flipping through, etc. material located within the binder) as shown in FIG. 4. When in the unlocked position, the movable portion 140 may still be retained by the stationary portion 130 such that the movable portion 140 may not be decoupled, or removed, from the stationary portion 130. In other words, although the movable portion 140 may be unlocked from the stationary portion 130 and free to pivot, the movable portion 140 and the stationary portion 130 may still be coupled together forming at least part of the second portion 120. Further, when in the locked position, the movable portion 140 may not be free to pivot about any axis and may be described as being rigidly and securely positioned with respect to the stationary portion 130 and extending away from the stationary portion 130 so as to provide support for the front and rear cover portions 20, 30 of the binder 10.

Figure 6:
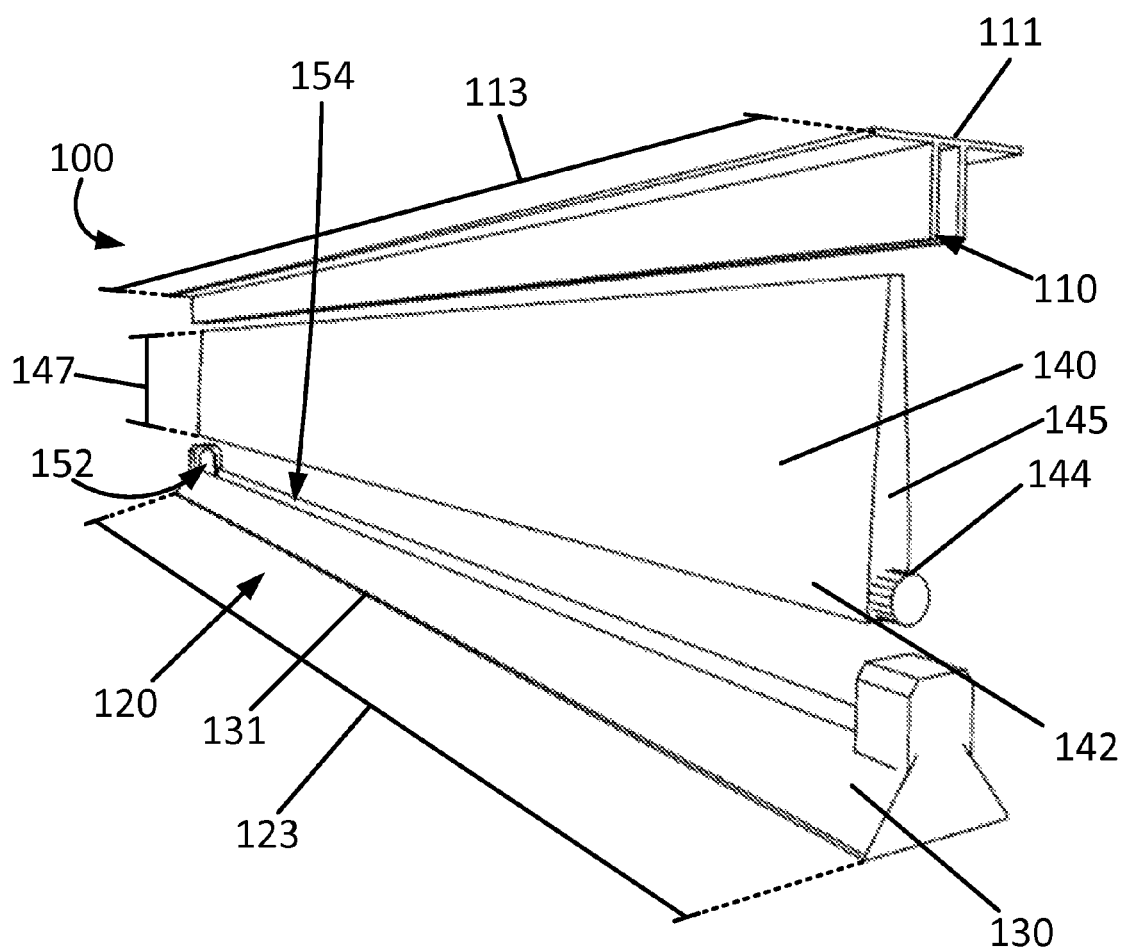
FIG. 6 is an exploded, perspective view of the binder support apparatus of FIG. 5.

To provide the movement and locking/unlocking functionality of the moveable portion 140, the stationary portion 130 may define a first slot (not shown but substantially similar to the second slot 152) located proximate the first end region 122, a second slot 152 located proximate the second end region 124, and a locking slot 154 extending between the first slot and the second slot 152. The first and second slot 152 may extend orthogonal to the second portion axis 125 and may be described as being pill-shaped. For example, each of the first and second slots 152 may be a groove defined within the material of the stationary portion 130. The locking slot 154 may extend parallel to the second portion axis 125 between the first and second slots 152 as shown in FIG. 6. Similarly to the first and second slots 152, the locking slot 154 may be groove defined within the material of the stationary portion 130.

When in the locked position, a rear region 142 of the movable member 140 may be located in the locking slot 154 of the stationary portion 130. Conversely, when in the unlocked, the rear region 142 of the movable member 140 may not be located in the locking slot 154 of the stationary portion 130. The locking slot 154 may be sized (e.g., depth, width, etc.) to securely hold the rear region 142 of the movable portion 140 therein when in the locked position. For example, the locking slot 154 may retain the rear region 142 of the movable portion 140 with an interference fit. Moreover, the amount of force to unlock, or dislodge, the rear region 142 of the movable portion 140 from the locking slot 154 may be such that a user (e.g., using their hands and fingers) may be able to unlock, or dislodge, the rear region 142 from the locking slot 154 and relock, or insert, the rear region 142 into the locking slot 154. Also, the amount of force to unlock, or dislodge, the rear region 142 of the movable portion 140 from the locking slot 154 may be such that the rear region 142 may not dislodge, fall out of, or move from the locking slot 154 inadvertently or without deliberate action from a user. The locking slot 154 may define a depth 153 as shown in FIG. 7. The depth 153 may be about ⅛ of an inch to about 1½ inches such as, e.g., about ⅛ of an inch, about ¼ of an inch, about ⅜ of an inch, about ½ of an inch, about ⅝ of an inch, about ¾ of an inch, about ⅞ of an inch, about 1 inch, about 1⅛ inches, 1¼ inches, 1⅜ inches, 1½ inches, etc.

The first and second slots 152 may allow, or provide the functionality for, the rear region 142 of the movable member 140 to be moved into and out of the locking slot 154. For example, the movable portion 140 may include a first pin 144 (or another structure) proximate the first end region 122 configured to be located in the first slot of the stationary portion 130 and a second pin (not shown in the drawings but substantially similar to the pin 144) proximate the second end region 124 configured to be located in the second slot 152 of the stationary portion 130. Although this embodiment includes cylinder-shaped pins, it is to be understood that other embodiments may use one or more different size and/or shaped structures, portions, or members, to provide the same or similar functionality as the pins 144 (e.g., to provide the movable and pivotal coupling between the movable member 140 and the stationary member 130). The pins 144 may be movable within the first and second slots 152 such that the rear region 142 of the movable portion 140 may be moved into and out of the locking slot 154. For example, when the first and second pins 144 are located in the position shown in the cross sectional view of the binder support apparatus depicted in FIG. 7, the rear region 142 of the movable portion 140 may not be located in the locking slot 154, and as such, the movable portion 140 may be free to pivot about the second portion axis 125. To move the movable portion 140 in the locked position, the moveable portion 140 may be moved in the direction of arrow 170 depicted in FIG. 7. Further, as shown, the pins 144 define a cylindrical shape extending from an end surface 145 of the movable portion 140 to, e.g. facilitate pivotal movement or rotation, when the movable portion 140 is in the unlocked position and to provide linear, sliding movement of the movable portion 140 between the locked and unlocked positions.

Figure 9:
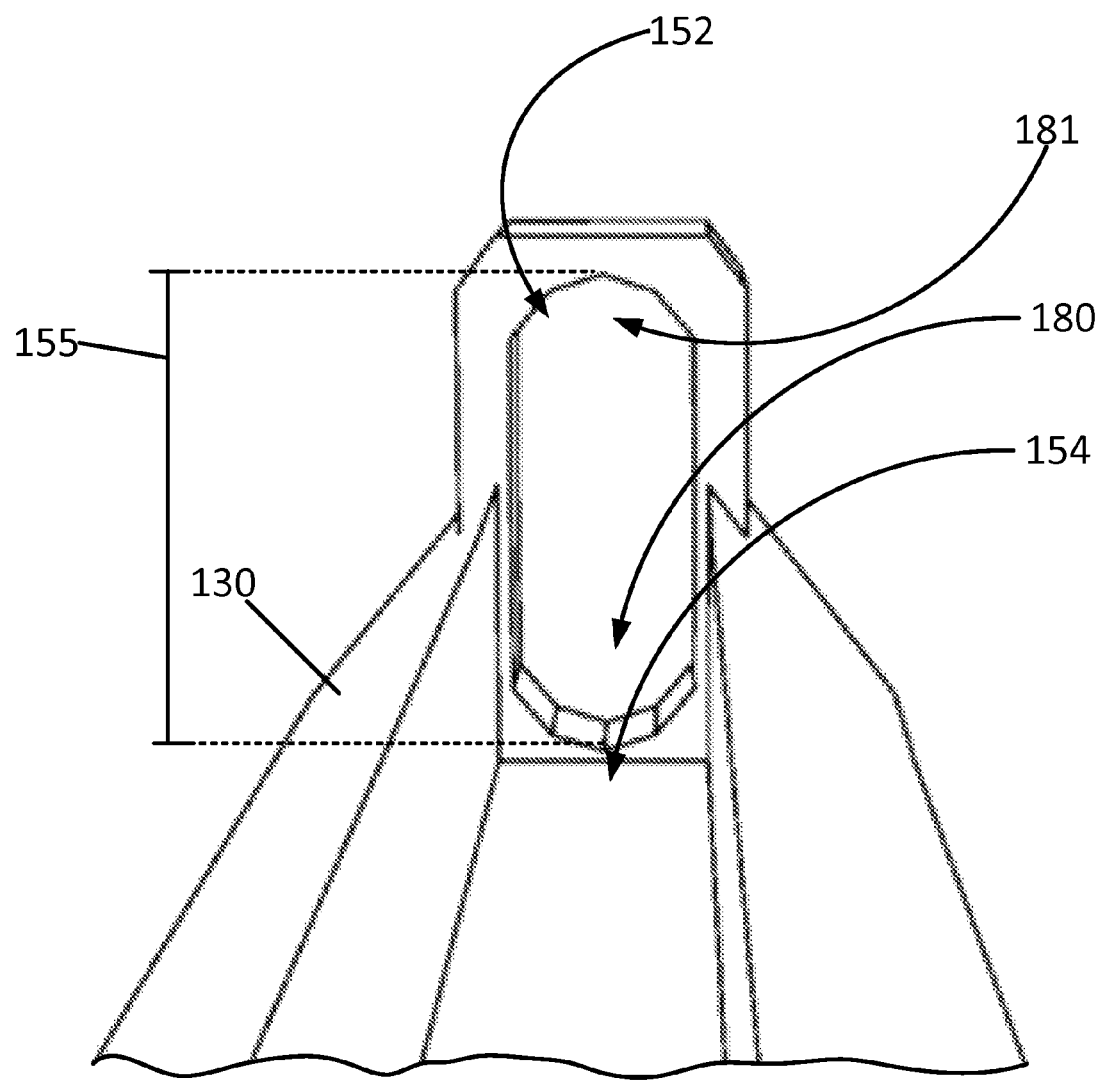
FIG. 9 is a perspective view of a stationary portion of the binder support apparatus of FIG. 5.

The first and second slots 152 may define a length 155 as shown in FIG. 9, and the locking and unlocking positions may be described in terms of locking and unlocking regions along the length 155 of the first and second slots 154. For example, each of the first and second slots 152 may define an unlock region 181 and a lock region 180 as shown in FIG. 9. The unlock region 181 may be located at the opposite end of the slot 152 than the lock region 180. When the pins 144 are located in the unlock regions 181, the movable portion 140 may be free to move and pivot about the second portion axis 125. When the pins 144 are located in the lock regions 180, at least a part, or portion, of the rear region 142 of the movable member 140 may be located the lock slot 154. In other words, when the first and second pins 144 of the movable portion 140 are located in the unlock region 181, the movable portion 140 is in the unlocked position, and when the first and second pins 144 of the movable portion 140 are located in the lock region 180, the movable portion 140 is in the locked position.

As best shown in FIG. 7, the movable portion 140 may define a taper from the rear region 142 to a distal region 146. At least part, or a percentage, of the distal region 146 may be configured to mate with the mating region 116 of the first portion 110 to support the front and rear cover portions 20, 30 apart from one another. For example, at least part of the distal region 146 may extend into a portion, or part, of the depth 119 of the channel 117. In other embodiments, the movable portion 140 may not define a taper. For example, the movable portion 140 may have a rectangular cross-section. As shown in FIG. 6, the movable portion 140 may define a height 147 extending from the rear region 142 to the distal region 146. The height 147 may be about 1.5 inches to about 4 inches depending on the height of the spine of the binder (e.g., the height may be larger for larger spines and smaller for smaller spines to facilitate a square, stackable shape). For example, the height 147 of the movable portion 140 may greater than or equal to about 0.5 inches, about 1 inch, about 1.5 inches, about 1.66 inches, about 2.5 inches, about 2.66 inches, about 3.33 inches, about 3.5 inches, about 4 inches, about 4.5 inches, 5 inches, 5.5 inches, 6 inches, etc. Further, for example, the height 147 of the movable portion 140 may less than or equal to about 1.66 inches, about 2.5 inches, about 2.66 inches, about 3.33 inches, about 3.5 inches, about 4 inches, about 4.5 inches, 5 inches, 5.5 inches, 6 inches, about 7 inches, about 8 inches, etc.

Figure 10:
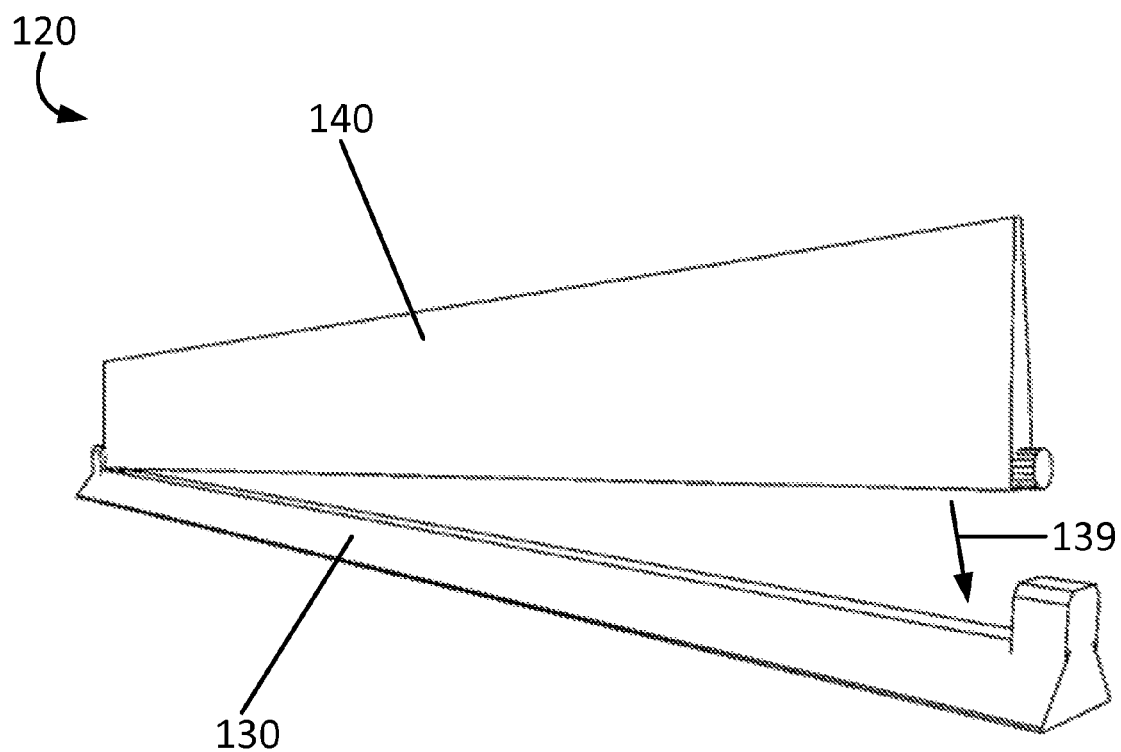
FIG. 10 is a perspective view of a stationary portion and a movable portion of the binder support apparatus of FIG. 5 coupled together.
Figure 11:
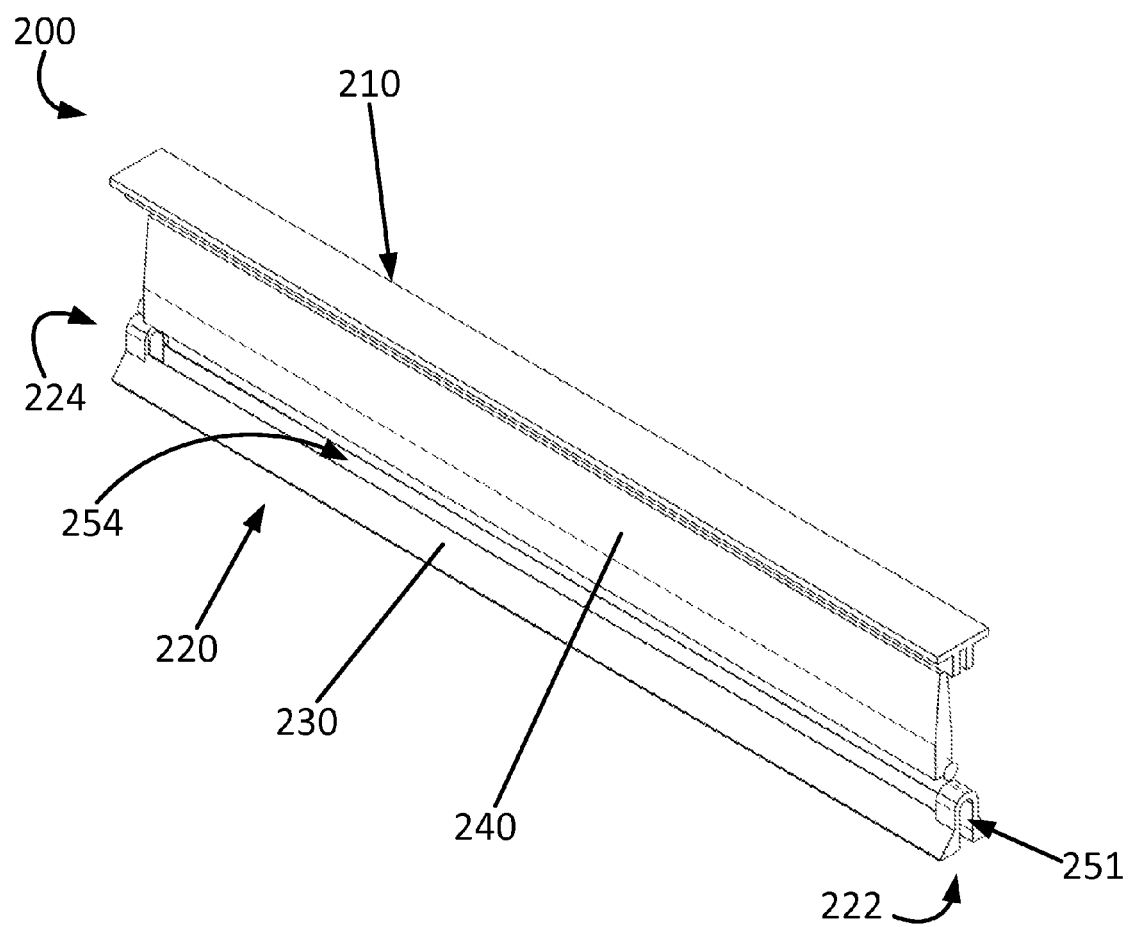
FIG. 11 is an exploded, perspective view of another exemplary binder support apparatus.
Figure 12:
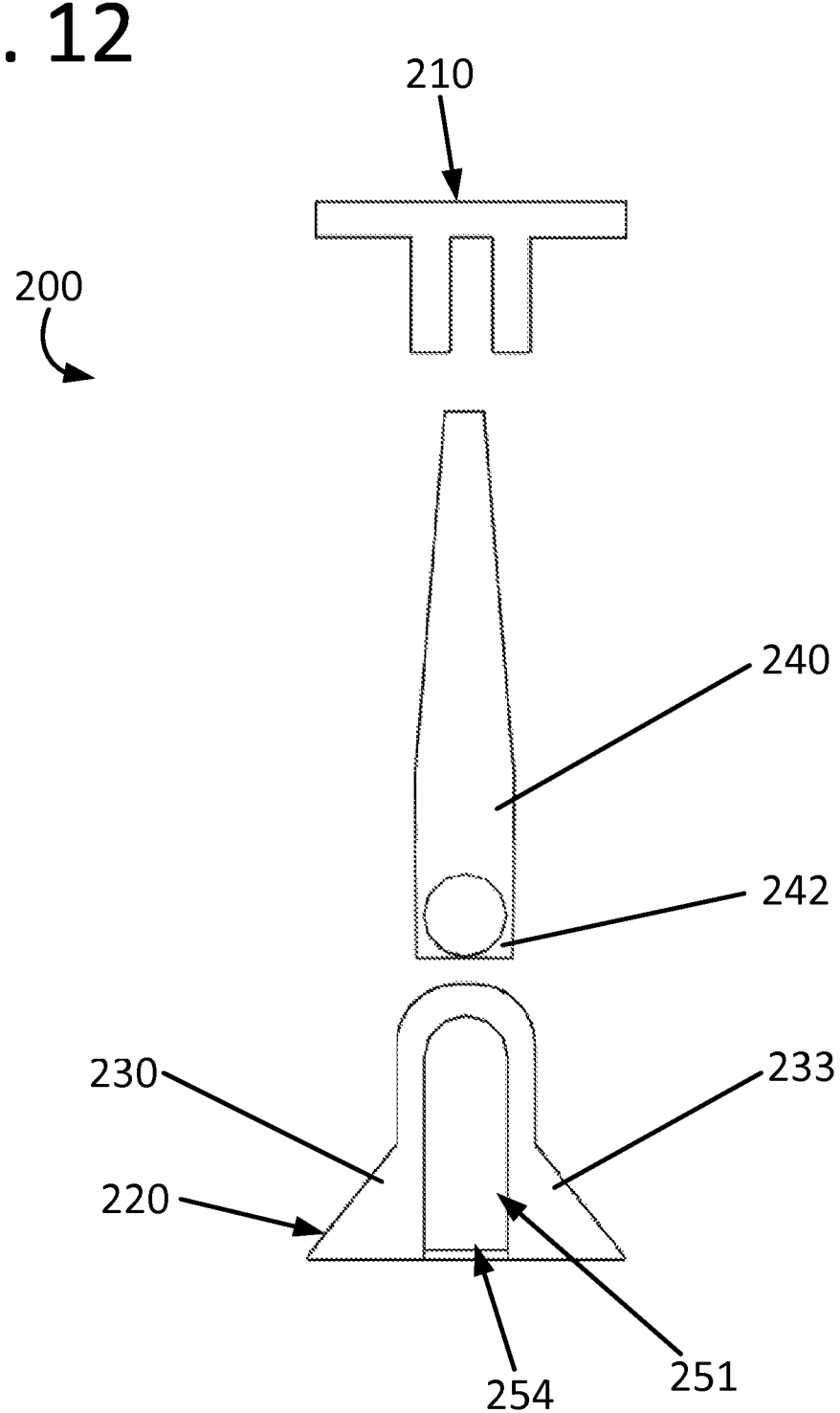
FIG. 12 is an exploded, end view of the binder support apparatus of FIG. 11.

The binder support apparatus 100, and any other parts thereof, may include and/or be formed of any material operable to provide the functionality described herein. For example, the binder support apparatus 100 may include one or more materials such as polymers (e.g., acrylonitrile butadiene styrene (ABS), etc.), metals (e.g., aluminum, steel, tin, metal alloys, etc.), synthetic material, wood material, particleboard material, etc. Further, the binder support apparatus 100 may be somewhat resilient or flexible, e.g., for assembly purposes. As shown in FIG. 10, the movable portion 140 and/or the stationary portion 130 may be flexed to allow the movable portion 140 and the stationary portion 130 to be coupled together as indicated by the arrow 139. For example, the moveable portion 140 and/or the stationary portion 130 may be flexed, or deformed, such that at least a portion thereof is deflected from, or moved off of, the axis 115, 125 upon which it extends. In at least one embodiment, the movable portion 140 may "snap" into the stationary portion 130 by placing one pin 144 into one of the slots 152 and bending, or bowing, the stationary portion 140 slightly while guiding the other pin into the other slot. In at least one embodiment, the movable portion 140 may "snap" into the stationary portion 130 by placing one pin 144 into one of the slots 152 and bending, or bowing, the movable portion 140 slightly while guiding the other pin into the other slot.

The binder support apparatus 100 may be integrated (e.g., coupled to) into a binder 10 prior to sale or after sale. In other words, the binder support apparatus 100 may be part of a "stock" binder or may be a "retro-fit" accessory or kit. For example, one owning a binder 10 may purchase the binder support apparatus 100 as a kit to be fitted (e.g., coupled) to an already-owned binder. Further, for example, the binder support apparatus 100 may be manufactured as part of the binder 10 when the binder 10 is being manufactured (e.g., the binder support apparatus 100 could be integral to the binder 10 itself). In at least one embodiment, the binder support apparatus 100 may include (e.g., be formed of) the same one or more materials as the binder 10 itself.

Another exemplary binder support apparatus 200 is depicted in FIGS. 11-14. Similarly to the binder support apparatus 100 of FIGS. 2-10, the binder support apparatus 200 includes a first portion 210 and a second portion 220. The second portion 220 of the binder support apparatus 200 includes a movable portion 240 and a stationary portion 230. The stationary portion 230 extends from a first end region 222 to a second end region 224 and defines a locking slot 254 extending from the first end region 222 to the second end region 224 configured to engage, or lock, the movable portion 240 (e.g., a rear region 242 of the movable portion 240).

Figure 13:
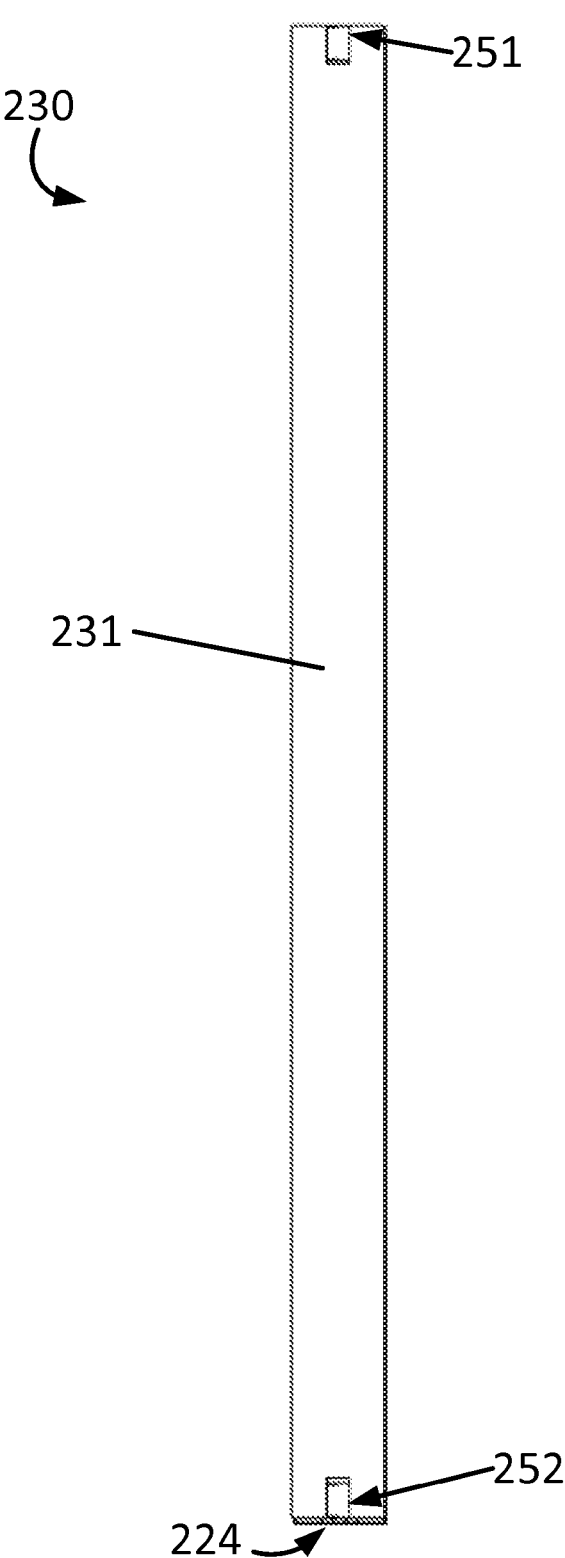
FIG. 13 is a bottom, plan view of a stationary portion of the binder support apparatus of FIG. 11.

A first slot 251 is defined in the stationary portion 230 proximate the first end region 222 and a second slot 252 is defined in the stationary portion 230 proximate the second end region 224. The first and second slots 251, 252 provide the same functionality as the first and second slots 152 of the stationary portion 130 of the second portion 120 described herein. For example, the slots 251, 252 may be configured to allow the movable portion 240 to move into and out of the locked and unlocked positions, and pivot about an axis when in the unlocked position. The first and second slots 251, 252 of the stationary portion 230 in this embodiment extend through wall regions 233 of the stationary portion 230 as shown in the end view of FIG. 12. The extension of the slots 251, 252 through the wall regions 233 of the stationary portion 230 may allow the stationary portion 230 to be more efficiently manufactured (e.g., injection molded using a two-piece mold as opposed to a greater than two-piece mold, etc.). The bottom surface 231 of the stationary portion 230 is depicted in FIG. 13. As shown, the slots 251, 252 also extend through a portion of the bottom surface 231.

Figure 14A:
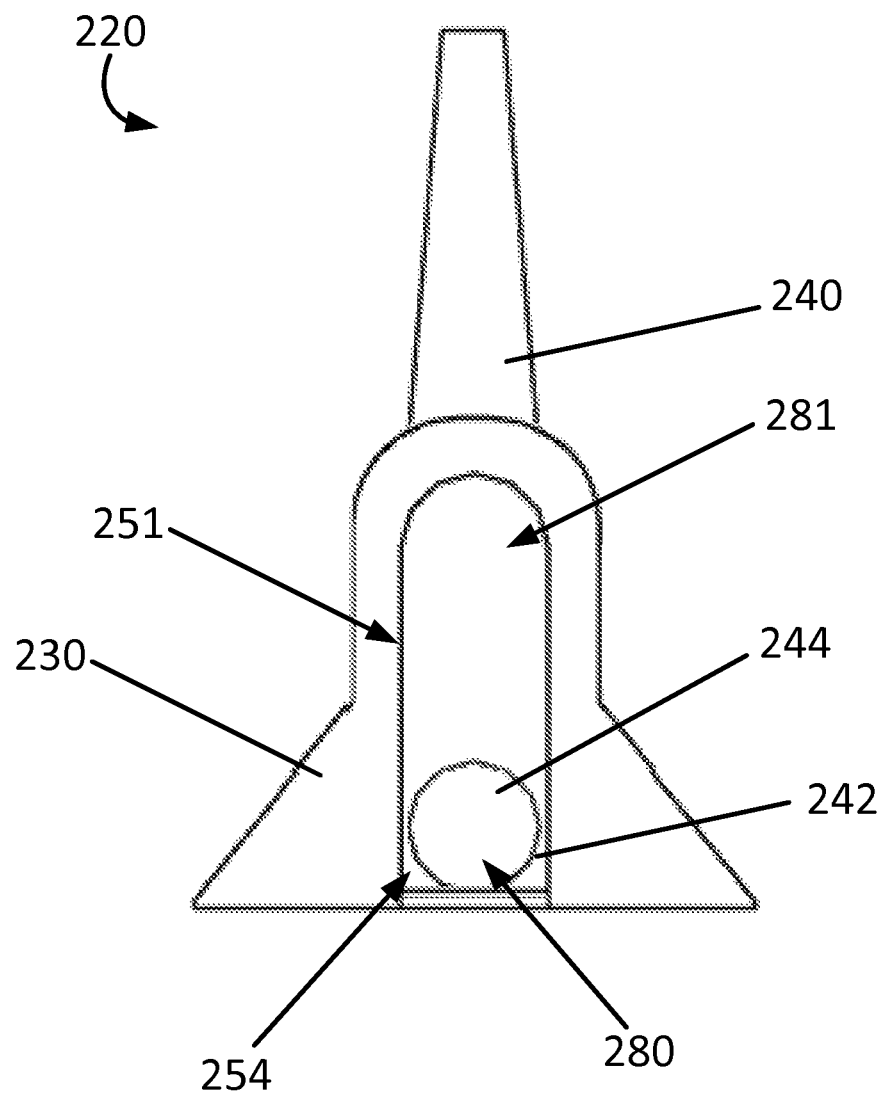
FIGS. 14A-14D are end views of a second portion of the binder support apparatus of FIG. 11.
Figure 14B:
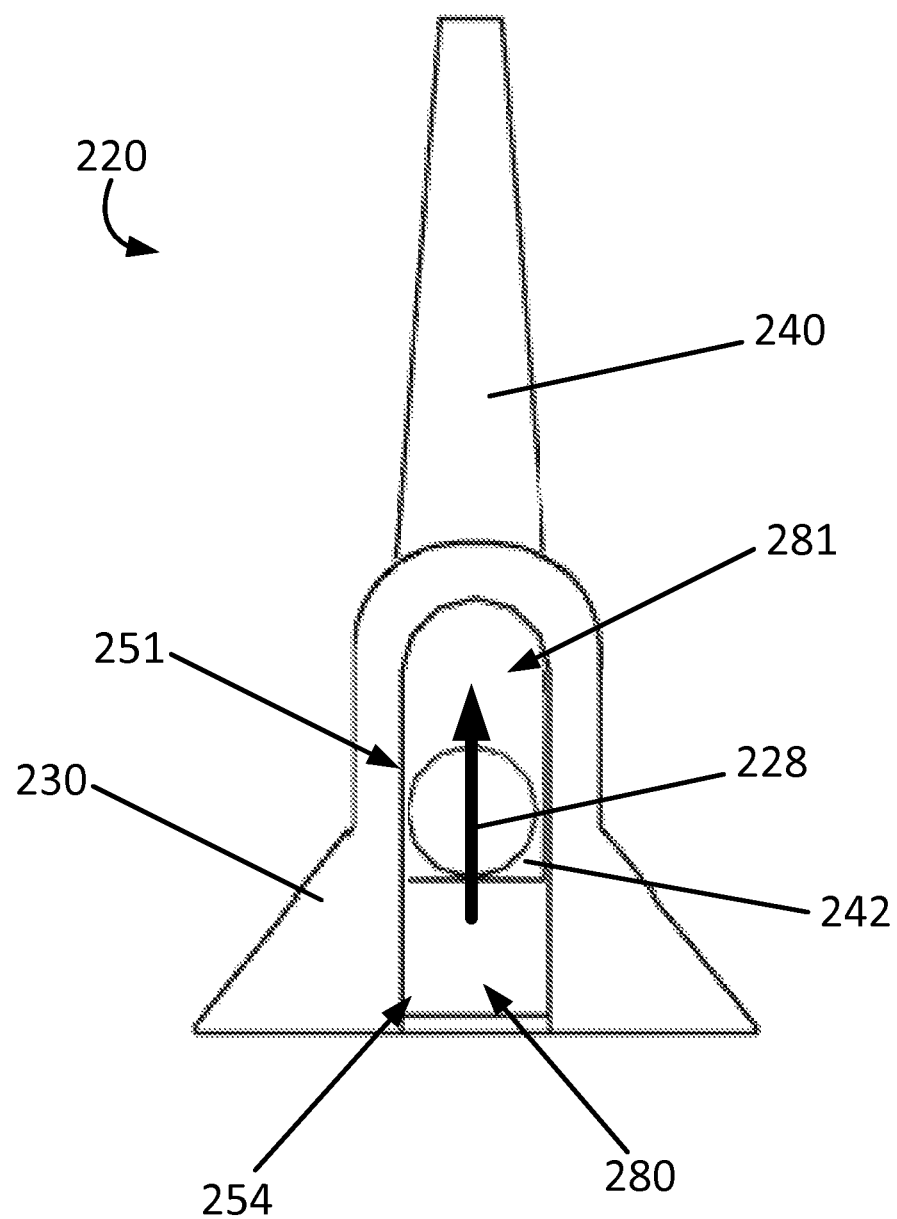

End views of the second portion 220 of the binder support apparatus 200 are depicted in FIGS. 14A-14D to show the movement of the movable portion 240 between the locked and unlocked positions and one pivoted position. As shown in FIG. 14A, the movable portion 240 is located in the locked position with the rear region 242 of the movable portion 240 located proximate a bottom area, or region, of the locking slot 254 and the pins 144 are located proximate the lock region 280 of the slots 251, 252. As user may grasp and move the movable portion 240 in direction 228 towards the unlock region 281 of the slot 251 with respect to the stationary portion 230 to disengage the movable portion 240 (e.g., the rear region 242 of the movable portion 240) from the locking slot 254 as shown in FIG. 14B.

Figure 14C:
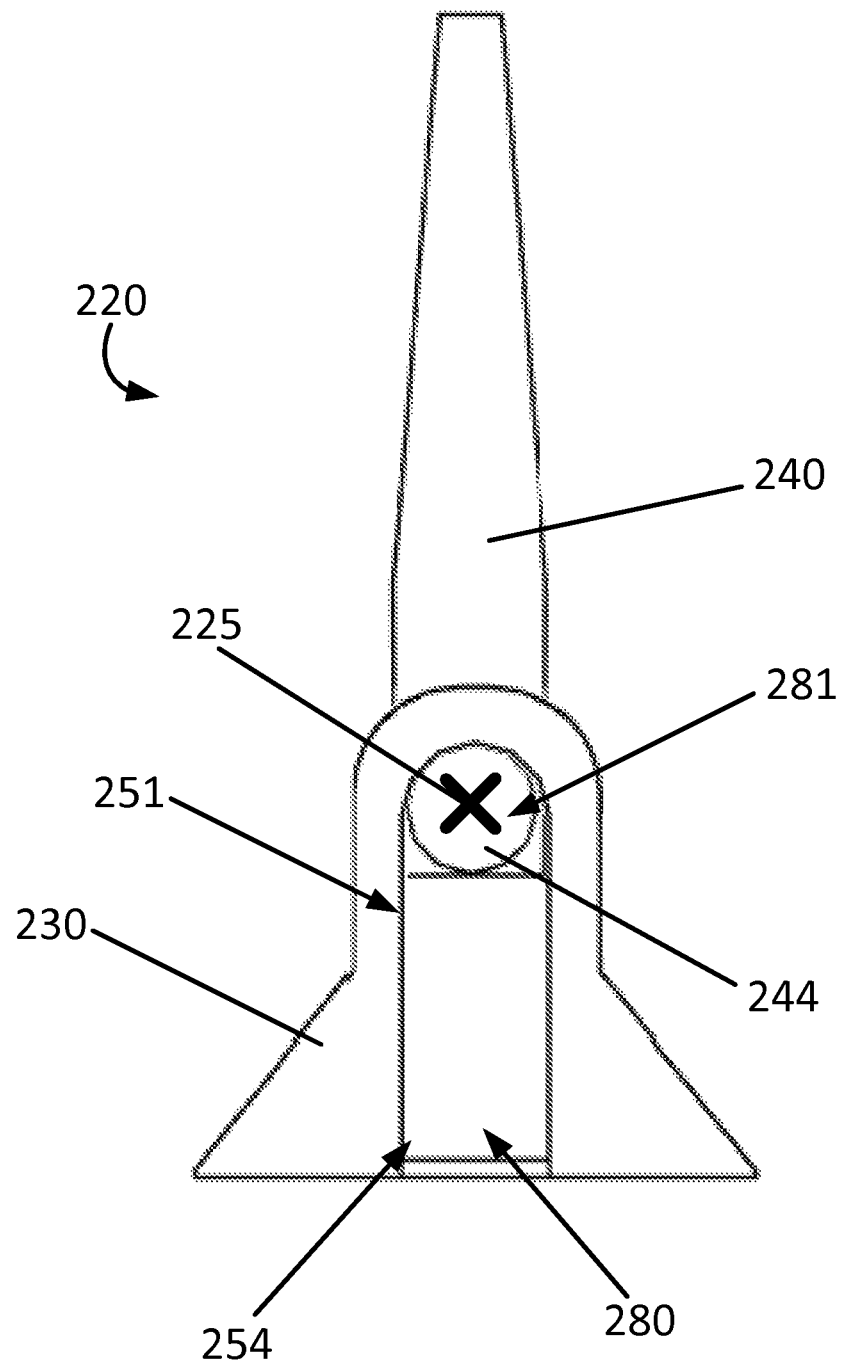
Figure 14D:
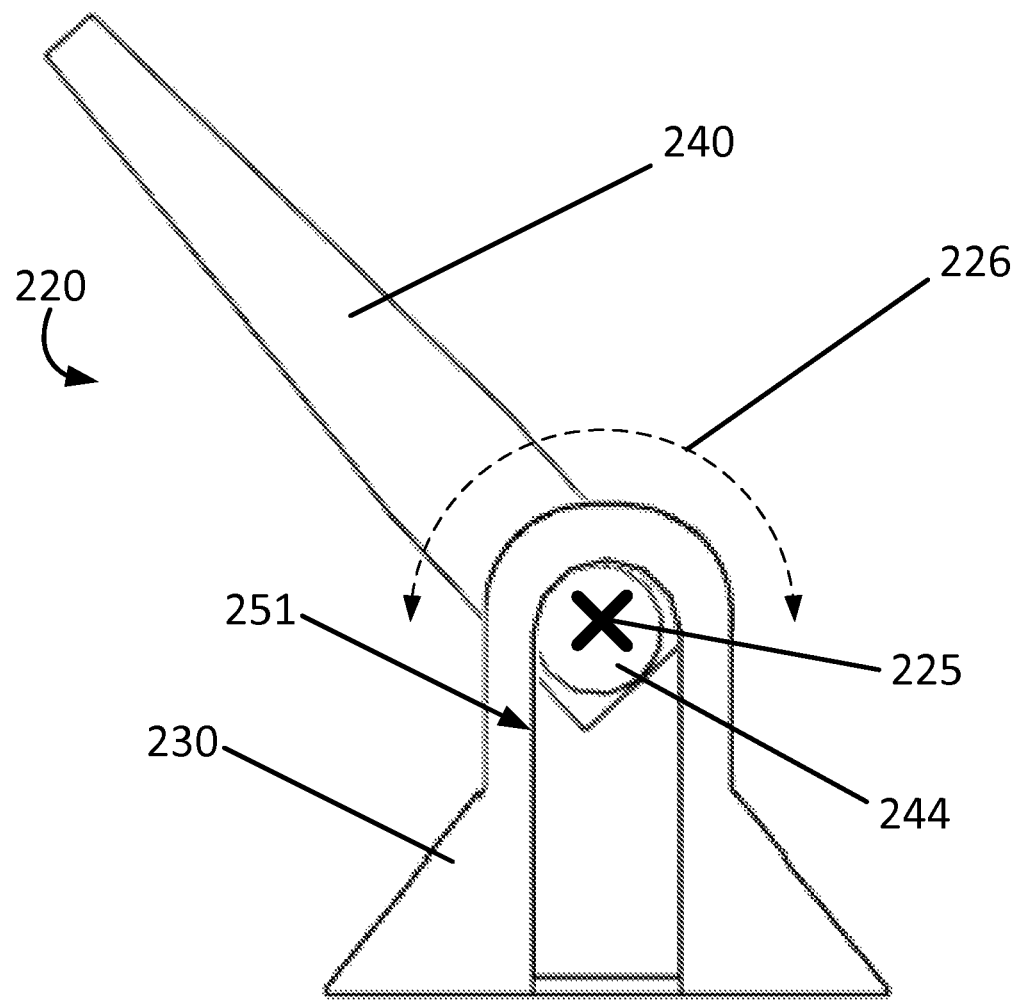

Once the rear region 242 of the movable portion 240 is moved into, or reaches, the unlock region 281 (e.g., the movable portion 240 may be stopped from moving further in direction 228 when the pins 244 of the movable portion 240 contact a top surface of the slots 251, 252) as shown in FIG. 14C, the movable portion 240 may be pivoted about a pivot axis 225 as shown in FIG. 14D. The movable portion 240 may be pivoted in either clockwise or counterclockwise directions 226 about axis 225 as shown in FIG. 14D.

This disclosure has been provided with reference to illustrative embodiments and has not meant to be construed in a limiting sense. As described previously, one skilled in the art will recognize that other various illustrative applications may use the techniques as described herein to take advantage of the beneficial characteristics of the apparatus and methods described herein. Various modifications of the illustrative embodiments, as well as additional embodiments of the disclosure, will be apparent upon reference to this description.

What is claimed is:

1. Binder support apparatus for supporting a front cover portion of a binder apart from a rear cover portion of the binder, wherein the front and rear cover portions each extend in a plane from a left end to a right end along a first axis and are coupled to each other proximate the left ends thereof, wherein the front and rear cover portions each extend from a bottom side to a top side along a second axis orthogonal to the first axis, wherein the binder support apparatus comprises:
    a first portion extending from a first end region to a second end region along a first portion axis and configured to be coupled to the front cover portion of the binder such that the first portion axis is parallel to the second axis of the binder, wherein the first portion defines a mating region;
    a second portion extending from a first end region to a second end region along a second portion axis and comprising:
        a stationary portion extending from the first end region to the second end region and configured to be coupled to the rear cover portion of the binder such that the second portion axis is parallel the second axis of the binder, and
        a movable portion movably coupled to the stationary portion, wherein the movable portion extends from the first end region to the second end region and is configured to mate with the mating region of the first portion to support the right ends of the front and rear cover portions of the binder apart from one another,
    wherein the first portion of the binder support apparatus is configured to extend along at least 50% of the distance between the bottom side of the front cover portion of the binder and the top side of the front cover portion of the binder and parallel to the second axis of the binder and the second portion of the binder support apparatus is configured to extend along at least 50% of the distance between the bottom side of the rear cover portion of the binder and the top side of the rear cover portion of the binder and parallel to the second axis of the binder.

2. The apparatus of claim 1, wherein the movable portion is movable between a locked position and an unlocked position, wherein the movable portion lies in a plane perpendicular to the rear cover portion when in the locked position, and wherein the movable portion is pivotable about the second portion axis when in the unlocked position.

3. The apparatus of claim 2, wherein the stationary portion of the second portion defines:
    a first slot extending orthogonal to the second portion axis and proximate the first end region;
    a second slot extending orthogonal to the second portion axis and proximate the second end region; and
    a locking slot extending parallel to the second portion axis between the first and second slots, and
wherein the movable portion comprises:
    a first pin proximate the first end region configured to be located in the first slot of the stationary portion to couple the movable portion to the stationary portion;
    a second pin proximate the second end region configured to be located in the second slot of the stationary portion to couple the movable portion to the stationary portion; and
    a rear region configured to be located in the locking slot of the stationary portion when in the locked position.

4. The apparatus of claim 3, wherein each of the first and second slots of the stationary portion defines an unlock region and a lock region, wherein the first and second pins of the movable portion are located in the unlock region when the movable portion is in the unlocked position, and wherein the first and second pins of the movable portion are located in the lock region when the movable portion is in the locked position.

5. The apparatus of claim 1, wherein the mating region of the first portion defines a receiving slot configured for receiving at least a portion of the movable portion of the second portion when the movable portion is mated with the mating region of the first portion to support the right ends of the front and rear cover portions apart from one another.

6. The apparatus of claim 1, wherein the first portion further comprises adhesive configured to couple the first portion to the front cover portion of the binder, and wherein the second portion further comprises adhesive configured to couple the stationary portion to the rear cover portion of the binder.

7. The apparatus of claim 1, wherein the movable portion of the second portion defines a taper from a rear region to a distal region, wherein at least part of the distal region is configured to mate with the mating region of the first portion to support the right ends of the front and rear cover portions apart from one another.

8. The apparatus of claim 1, wherein each of the first and second portions comprises polymer material.

9. The apparatus of claim 1, wherein the first portion is configured to extend along at least 75% of the distance between the bottom side of the front cover portion of the binder and the top side of the front cover portion of the binder and parallel to the second axis and the second portion of the binder support apparatus is configured to extend along at least 75% of the distance between the bottom side of the rear cover portion of the binder and the top side of the rear cover portion of the binder and parallel to the second axis.

10. The apparatus of claim 1, wherein the first portion is configured to extend along at least 90% of the distance between the bottom side of the front cover portion of the binder and the top side of the front cover portion of the binder and parallel to the second axis and the second portion of the binder support apparatus is configured to extend along at least 90% of the distance between the bottom side of the rear cover portion of the binder and the top side of the rear cover portion of the binder and parallel to the second axis.

11. The apparatus of claim 1, wherein the first portion defines a length extending along the first portion axis from the first end region to the second end region and the second portion defines a length extending along the second portion axis from the first end region to the second end region, wherein the lengths of the first and second portions are greater than 5 inches.

12. The apparatus of claim 11, wherein the lengths of the first and second portions are greater than 11 inches.

13. Binder support apparatus for supporting a front cover portion of a binder apart from a rear cover portion of the binder, wherein the front and rear cover portions each extend in a plane from a left end to a right end along a first axis and are coupled to each other proximate the left ends thereof, wherein the front and rear cover portions each extend from a bottom side to a top side along a second axis orthogonal to the first axis, wherein the binder support apparatus comprises:
  a first portion extending from a first end region to a second end region along a first portion axis and configured to be coupled to the front cover portion of the binder between the bottom side of the rear cover portion and the top side of the front cover portion such that the first portion axis is parallel to the second axis of the binder along which the front and rear cover portions of the binder each extend in plane from the bottom side to the top side, wherein the first portion defines a mating region;
  a second portion extending from a first end region to a second end region along a second portion axis and comprising:
    a stationary portion extending from the first end region to the second end region and configured to be coupled to the rear cover portion of the binder between the bottom side of the rear cover portion and the top side of the rear cover portion such that the second portion axis is parallel the second axis of the binder along which the front and rear cover portions of the binder each extend in plane from the bottom side to the top side, and
    a movable portion movably coupled to the stationary portion, wherein the movable portion extends from the first end region to the second end region and is configured to mate with the mating region of the first portion to support the right ends of the front and rear cover portions of the binder apart from one another, wherein the movable portion is movable between a locked position and an unlocked position, wherein the movable portion lies in a plane perpendicular to the plane within which the rear cover portion lies when in the locked position, and wherein the movable portion is pivotable about the second portion axis that is parallel the second axis of the binder when in the unlocked position.

14. The apparatus of claim 13, wherein the stationary portion of the second portion defines:
  a first slot extending orthogonal to the second portion axis and proximate the first end region;
  a second slot extending orthogonal to the second portion axis and proximate the second end region; and
  a locking slot extending parallel to the second portion axis between the first and second slots, and wherein the movable portion comprises:
  a first pin proximate the first end region configured to be located in the first slot of the stationary portion to couple the movable portion to the stationary portion;
  a second pin proximate the second end region configured to be located in the second slot of the stationary portion to couple the movable portion to the stationary portion; and
  a rear region configured to be located in the locking slot of the stationary portion when in the locked position.

15. The apparatus of claim 14, wherein each of the first and second slots of the stationary portion defines an unlock region and a lock region, wherein the first and second pins of the movable portion are located in the unlock region when the movable portion is in the unlocked position, and wherein the first and second pins of the movable portion are located in the lock region when the movable portion is in the locked position.

16. The apparatus of claim 13, wherein the mating region of the first portion defines a receiving slot configured for receiving at least a portion of the movable portion of the second portion when the movable portion is mated with the mating region of the first portion to support the right ends of the front and rear cover portions apart from one another.

17. The apparatus of claim 13, wherein the first portion further comprises adhesive configured to couple the first portion to the front cover portion of the binder, and wherein the second portion further comprises adhesive configured to couple the stationary portion to the rear cover portion of the binder.

18. The apparatus of claim 13, wherein the movable portion of the second portion defines a taper from a rear region to a distal region, wherein at least part of the distal region is configured to mate with the mating region of the first portion to support the right ends of the front and rear cover portions apart from one another.

19. The apparatus of claim 13, wherein the first is configured to extend along at least 20% of the distance between the bottom side of the front cover portion of the binder and the top side of the front cover portion of the binder and parallel to the second axis and the second portion of the binder support apparatus is configured to extend along at least 20% of the distance between the bottom side of the rear cover portion of the binder and the top side of the rear cover portion of the binder and parallel to the second axis.

20. The apparatus of claim 13, wherein the first portion defines a length extending along the first portion axis from the first end region to the second end region and the second portion defines a length extending along the second portion axis from the first end region to the second end region, wherein the lengths of the first and second portions are greater than 2 inches.

21. Binder support apparatus for supporting a front cover portion of a binder apart from a rear cover portion of the binder, wherein the front and rear cover portions each extend in a plane from a left end to a right end along a first axis and are coupled to each other proximate the left ends thereof, wherein the front and rear cover portions each extend from a bottom side to a top side along a second axis orthogonal to the first axis, wherein the binder support apparatus comprises:
  a first portion extending from a first end region to a second end region along a first portion axis and configured to be coupled to the front cover portion of the binder such that the first portion axis is parallel to the second axis of the binder, wherein the first portion defines a mating region;
  a second portion extending from a first end region to a second end region along a second portion axis and comprising:

a stationary portion extending from the first end region to the second end region and configured to be coupled to the rear cover portion of the binder such that the second portion axis is parallel the second axis of the binder, and a movable portion movably coupled to the stationary portion, wherein the movable portion extends from the first end region to the second end region and is configured to mate with the mating region of the first portion to support the right ends of the front and rear cover portions of the binder apart from one another, wherein the mating region of the first portion defines a receiving slot configured for receiving at least a portion of the movable portion of the second portion when the movable portion is mated with the mating region of the first portion to support the right ends of the front and rear cover portions apart from one another, wherein each of the first and second portions of the binder support apparatus is configured to extend along at least 50% of the distance between the bottom side and the top side of the binder.

\* \* \* \* \*